April 17, 1962  D. O. McCOY ETAL  3,030,621
TIME ENABLED BEAM SENSING AND LOGIC CIRCUITRY
FOR HORIZONTAL AIRCRAFT GUIDANCE
Filed Sept. 4, 1959  4 Sheets-Sheet 1
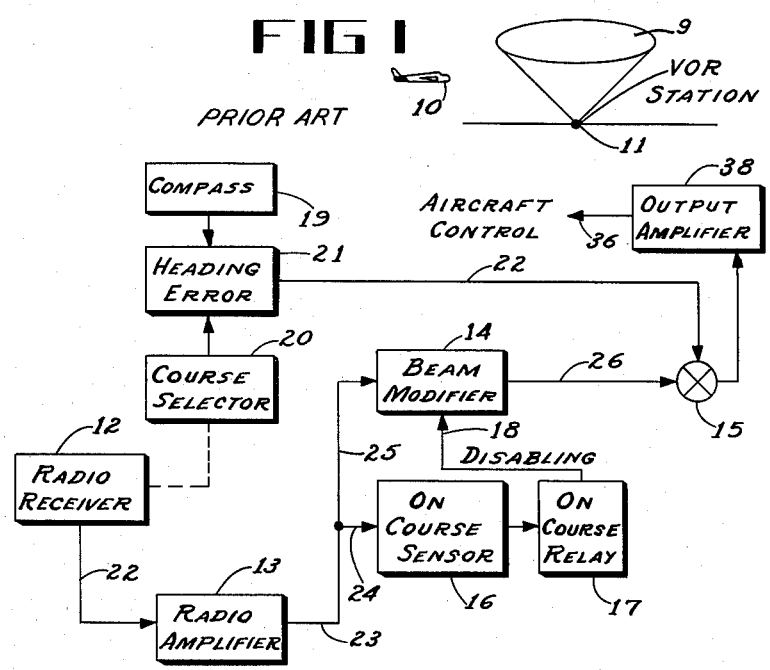
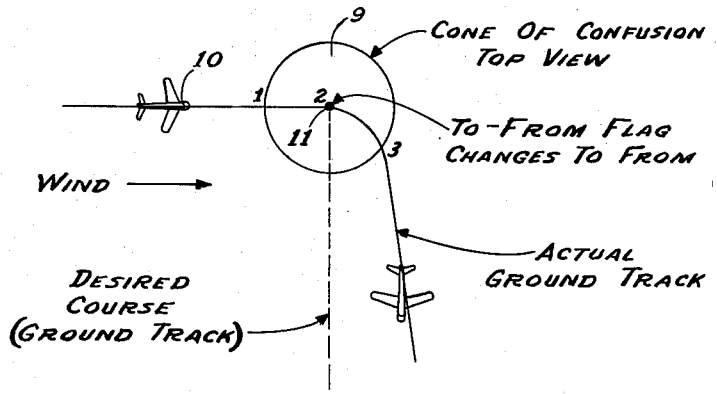
INVENTORS
DAVID O. McCOY
ILMAR LUIK
BY
  ATTORNEY
  AGENT April 17, 1962     D. O. McCOY ETAL     3,030,621
TIME ENABLED BEAM SENSING AND LOGIC CIRCUITRY
FOR HORIZONTAL AIRCRAFT GUIDANCE
Filed Sept. 4, 1959     4 Sheets-Sheet 2

INVENTORS
DAVID O. McCOY
ILMAR LUIK
BY *[signature]*
ATTORNEY
*[signature]*
AGENT INVENTORS
DAVID O. McCOY
ILMAR LUIK
BY
ATTORNEY
AGENT

United States Patent Office 3,030,621
Patented Apr. 17, 1962

3,030,621
TIME ENABLED BEAM SENSING AND LOGIC CIRCUITRY FOR HORIZONTAL AIRCRAFT GUIDANCE
David O. McCoy and Ilmar Luik, Cedar Rapids, Iowa, assignors to Collins Radio Company, Cedar Rapids, Iowa, a corporation of Iowa
Filed Sept. 4, 1959, Ser. No. 838,112
12 Claims. (Cl. 343—107)

This invention relates to aircraft flight control systems and more particularly to improvements in horizontal guidance signal control and development as incorporated in automatic flight control systems.

Co-pending application Serial No. 752,340 entitled "Aircraft Guidance System," filed July 31, 1958, and assigned to the assignee of the present invention, discloses improved horizontal aircraft guidance circuitry wherein means are incorporated to insure over-all smoothness of operation and system reliability by the inclusion of circuitry which selectively combines radio deviation signals with heading error signals for the development of a composite bank command signal.

The automatic flight control system disclosed in this co-pending application includes the development of a bank command signal from heading error and radio course deviation for reasons known in the art. The heading error approximates the rate at which the aircraft is approaching a selected course and is, therefore, used for damping to adequately control the horizontal guidance of the aircraft. Means are included in systems of this referenced type whereby radio is mixed with heading to form a composite bank command signal only under flight conditions when the radio signal is reliable. Specifically, when radio deviation exceeds a predetermined amount or is varying erratically, provisions are included to automatically exclude radio such that the bank command signal is developed from heading error only. Such selective exclusion of radio deviation signals is, therefore, advantageously realized under two flight conditions— the first condition existing when the aircraft is far off the radio-defined beam and the second condition when the aircraft is within the cone of confusion directly over the radio navigation station. Circuitry which excludes radio under these unreliable conditions has, therefore, been termed "beam modifier circuitry" or more specifically "on-course sensor circuitry" and "beam sensor circuitry" respectively.

In horizontal guidance systems incorporating such selective inclusion of radio signal there may exist, under certain flight conditions, two flight situations under which the aircraft may disadvantageously continue to fly in accordance with heading error signals only, such that a desired new heading is ultimately attained but the ground track desired may not be attained.

It is an object of the present invention, therefore, to improve autopilot horizontal guidance signal development circuits of the type which exclude radio under conditions of excessive signal or erratic signal by the novel inclusion of radio signal analysis means in conjunction with timing means whereby under all flight conditions a bank command signal is developed to assure that the aircraft can attain and hold a desired course.

The present invention is featured in the inclusion of novel timing and logic circuitry whereby under certain flight conditions the radio beam analysis circuitry which normally cuts out radio signal is temporarily rendered ineffective and wherein autopilot recycling to attain a desired ground track under these certain flight conditions is not necessary.

Specific flight problems which may be obviated by the present invention, and the manner in which the present invention operates to correct these disadvantageous situations will be further defined and described with reference to the accompanying drawings, in which:

FIGURE 1 is a diagrammatic representation of the cone of confusion existing over a VOR navigation station;

FIGURE 2 is a block diagram of known aircraft horizontal guidance circuitry prior to the incorporation of the present invention;

FIGURE 3 is a further diagrammatic illustration of the cone of confusion over a radio station illustrating a disadvantageous ground track which may result from the horizontal guidance arrangement of FIGURE 2;

FIGURE 4 is a functional block diagram showing the inclusion of the timing and logic circuitry of the present invention with the horizontal guidance arrangement of FIGURE 2;

FIGURE 5 is a diagrammatic representation of a further disadvantageous flight situation as subsequently corrected by the inclusion of the present invention;

Figure 6:
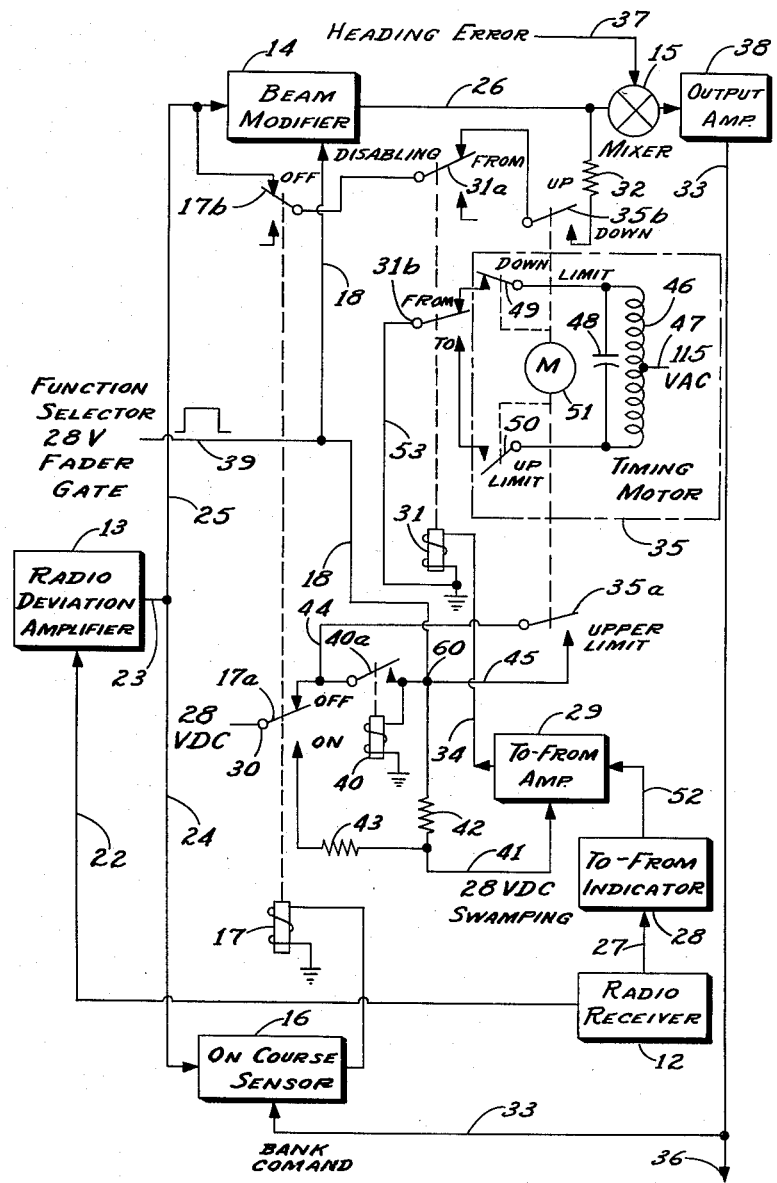
FIGURE 6 is a functional schematic diagram of horizontal guidance circuitry improved in accordance with the present invention.

The present invention is included in autopilot systems which incorporate in their horizontal guidance signal development the provision for excluding radio when the radio signal exceeds a predetermined value or varies erratically. As above-referenced, a system of this type is disclosed in co-pending application Serial No. 752,340. The circuitry to be discussed receives a radio signal taken from a visual omni-range (VOR) station which radiates an infinite number of radio beams in all directions. The pilot may select any one of these beams by the selection of a given course and follow it toward the ground station or away from the ground station as desired. As long as the aircraft is on the selected course, the radio deviation signal is zero and deviations from the desired course result in radio deviation signals with polarity and magnitude indicative of the direction and extent respectively of the aircraft's displacement with respect to the selected course.

Conventional horizontal guidance autopilot systems combine radio deviation signal with a heading error signal to arrive at a composite bank command signal for aircraft control. It has been found desirable to selectively exclude the radio signal under conditions when it is excessively large or varies erratically. Such a system is defined in the above-referenced co-pending application and is illustrated functionally in FIGURE 2. With reference to FIGURE 2, an output amplifier 38 is seen to provide a composite output signal 36 for horizontal aircraft control. Amplifier 38 receives a composite signal from a mixer 15. Inputs to mixer 15 are radio deviation from connector 26 and heading error from connector 22 which, in a well-known manner, are indicative of the degree of course deviation and the rate-of-change of this deviation respectively. Heading from compass 19 is compared with a selected ratio course from course selector 20 in a heading error development circuit 21 such that the output 22 therefrom is indicative of any discrepancy between the compass heading and the selected course. Radio receiver 12 provides a course deviation signal 22 to radio amplifier 13. The output 23 from radio amplifier 13 is applied through connector 25, beam modifier 14, and connector 26 to the mixer 15. Beam modifier 14, as will be further described, prevents the radio signal from reaching mixer 15 should the radio signal exceed a predetermined value or vary erratically. The radio signal from amplifier 13 is additionally connected through connector 24 to an on-course sensor 16. On-course sensor 16, as will be further described, operates an on-course relay 17 only when the radio signal is less than a predetermined value such as to define an "on-course" condition. On-course relay 17 affects an interconnection 18 with beam modifier 14 such that beam modifier 14 is rendered ineffective in blocking the radio signal during off-course conditions.

The arrangement of FIGURE 2 is, under most flight situations, extremely effective in controlling horizontal aircraft guidance. However, the inclusion of the beam modifier and on-course sensor monitoring functions, with respect to the radio signal, may create difficulties should the pilot desire to fly directly over the radio station and select a new course for a subsequent flight leg at that time.

With reference to FIGURE 1, there exists over the radio station 11 a cone of confusion area designated by reference numeral 9. Radio reception within the cone 9 is extremely unreliable and erratic and it is for this reason that circuitry as shown in FIGURE 2 is included to exclude radio under these conditions.

With reference to FIGURE 3, an aircraft 10 is seen to be approaching a radio station 11 on a course of 90°. With the guidance circuitry of FIGURE 2 the beam modifier circuitry 14 is enabled since the on-course sensor indicates an "on-course" condition. When the aircraft reaches the cone of confusion at point 1, the radio deviation signal swings erratically to excessive values either side of zero, and the beam modifier 14 of FIGURE 2 will automatically block the radio signal such that the aircraft control signal is that of heading error only. Thus with reference to FIGURE 3, the aircraft would continue flying on heading only to the center of the cone 12, point 2.

When the aircraft reaches point 2, the radio receiver indicates on a conventional to-from indicator well known in the art that the aircraft is flying from the station 11 rather than to the station 11 as at point 1. At this point, as is often desirous in normal airline flying, the pilot may wish to change his course to fly from station 11 on a desired ground track to a destination or further way-point. The selection of a new heading of 180° when the to-from flag changes to FROM at point 2 will initiate a heading error signal which will control the aircraft so as to initiate a turn toward attainment of the 180° heading.

Normal aircraft turns might then result in the aircraft being at point 3 in FIGURE 2 where the heading of 180° may be realized but it is to be noted that the aircraft may be far from the desired course or ground track as indicated. Further, the radio deviation signal (since it is in accordance with the displacement of the aircraft from the desired ground track) may be large enough to cause the beam modifier 14 of FIGURE 2 to block radio from the mixer 15. Under this condition the aircraft could attain the new 180° heading as indicated in FIGURE 3, but may never be guided to the desired ground track since radio would continue to be excluded from the bank command signal.

In the absence of cross wind the aircraft might continue then to follow the 180° heading parallel to the desired ground track. Were a cross wind blowing as indicated in FIGURE 3, it is seen that the aircraft would continue to parallel the desired ground track and actually be displaced farther and farther from the ground track. It is conceivable that were the wind blowing in a direction opposite to that indicated the aircraft might be blown towards the desired ground track until radio deviation became small enough such that the beam modifier 14 of FIGURE 2 would allow radio to be mixed with heading, in which case the composite signal would bring the aircraft ultimately onto the desired course. In any event, under this flight condition the horizontal guidance of the aircraft is not effective in bringing the aircraft onto the desired course under all wind conditions and in a minimum of time.

With reference to FIGURE 5, still another flight situation is illustrated wherein horizontal guidance circuitry of the type illustrated in FIGURE 2 may be ineffective in bringing the aircraft onto the desired new course. With reference to FIGURE 5, the aircraft 10 is seen to be flying on a course of 90° to a first radio station 1. The pilot may at point 1 desire to switch to radio station 2 and set a course for 180° to station 2. At the point of station switch the radio error signal is in accordance with the aircraft displacement from the 180° course to station 2. Radio error at this point may be excessive with respect to station 2 and thus the beam modifier 14 of FIGURE 2 would prevent radio from being combined with heading for aircraft control. In a manner similar to the situation of FIGURE 3, the aircraft then would be guided in response to heading only and a turn would be commanded by the heading error signal such that the aircraft attains a 180° heading. In the absence of radio signal, a ground track may result which is displaced from the desired ground track (that is, the 180° track to station 2). Here again a disadvantageous situation arises where the aircraft in the absence of radio control may never attain the desired ground track to the new station.

In each of the flight situations of FIGURES 3 and 5 it is seen that, should means be incorporated whereby the normal operation of the beam modifier 14 of FIGURE 2 is bypassed so as to force the inclusion of radio even though it is normally excluded, the aircraft might then be guided toward the desired ground track. The present invention includes such means and further includes logic circuitry such that the normal and desirable functioning of the beam modifier 14 is not impaired. The present invention is, therefore, directed to an improvement of the circuitry of FIGURE 2 whereby a novel timing means is incorporated in conjunction with logic switching circuitry such that, in effect, a circuit is closed around the beam modifier 14 of FIGURE 2 for a discrete period of time to allow sufficient radio to be included in the development of the horizontal guidance control to guide the aircraft toward the desired radio beam and thus enable normal "on-course" conditions to once again take over and guide the aircraft to make good the desired course. As will be further described, the timing and logic circuitry are completely compatible with the system of FIGURE 2 so as to insure the attainment of the desirable beam analysis normally performed.

FIGURE 4 represents functionally the incorporation of the timing and logic circuitry with the basic horizontal guidance circuitry of FIGURE 2. Corresponding elements are like referenced. Radio error signal is taken from radio receiver 12 through connector 22 to radio deviation amplifier 13. As in the circuitry of FIGURE 2, the output 23 from radio amplifier 13 is applied through beam modifier 14 and connector 26 to mixer 15. Similarly, radio amplifier output 23 is taken through connector 24 to on-course sensor 16. As will be further discussed, on-course sensor 16 develops an output to energize an "on-course" relay 17 when the radio error signal is less than a predetermined value and/or the bank command signal from connector 33 is less than a predetermined number of degrees. On-course relay 17 is shown in the "off-course" position. A first set of contacts 17a provide 28 volts D.C. from source 30 as a disabling voltage through connector 18 to beam modifier 14.

In the presence of input radio signals on connector 25 which are not excessive and which do not vary erratically, the beam modifier 14 is normally fully conductive so as to close an electronic switch therein through which the radio signal may pass from connector 25 to connector 26 and hence to mixer 15. The disabling tie-in between the beam modifier 14 and the on-course relay 17 through connector 18 is provided such that during an off-course condition of relay 17 as illustrated, the beam modifier is forced to close the electronic switch and enable the passage of radio signals regardless of the condition of the radio signal input on connector 25. Thus, only during an on-course condition is the beam modifier 14 enabled to analyze the radio signal input thereto and prevent its passage to mixer 15 should it be excessive or be varying erratically.

As previously discussed with reference to FIGURE 3, when the aircraft 10 is flying on the 90° course to station 11 as illustrated, the on-course sensor 16 of FIGURE 4 holds on-course relay 17 energized, the disabling interconnection 18 is ineffective as concerns beam modifier 14, and beam modifier 14 is thus readied to prevent the passage of excessive or erratically varying radio signal. As the aircraft 10 in FIGURE 3 reaches the cone of confusion at point 1, the radio signal becomes excessive and varies erratically, and the beam modifier 14 opens its electronic switch to prevent the passage of radio from connector 23 through connector 26 to mixer 15. Thus as previously discussed, the output amplifier 38 develops a control signal for horizontal guidance of the aircraft which is responsive only to heading error. As previously discussed, the pilot may wish to change to a new heading and course of 180° as he passes over the center of the cone of confusion indicated as point 2 in FIGURE 3. In the absence of further control circuitry, the aircraft might continue, responsive to heading command only, and on a ground track other than that defined by the selected course.

With reference now to FIGURE 4, radio receiver 12 operates a to-from indicator in addition to the development of a course line deviation error signal. This operation is conventional in omni-range VOR receivers and is provided to indicate to the pilot whether the aircraft is flying the selected course To or From the radio station. The present invention utilizes this change-over of the to-from indicator which occurs in the center of the cone of confusion to initiate a timing mechanism which ultimately effects a bypass of the beam modifier 14, such that the radio signal may be applied in some degree to the mixer 15 even though the signal would normally be excluded from the mixing operation.

With reference to FIGURE 4, signal indicative of to-from indications from radio receiver 12 are applied through connector 27 to a to-from indicator 28. The signal here applied is a conventional D.C. signal with positive or negative polarity indicative of From and To flight conditions, respectively. The signals operating the to-from indicator are applied to a to-from amplifier 29. Through a swamping tie-in indicated as connector 41 between on-course sensor 16 and the to-from amplifier 29, a timer control voltage is developed in conjunction with to-from amplifier 29 to selectively activate a timing motor 35. To-from amplifier 29 additionally controls a switch 31a which is serially connected with a contact 17b of on-course relay 17 and a further timer operated switch 35b to complete a shunting arrangement around beam modifier 14 under the conditions illustrated; that is, the aircraft must be flying From the station to close switch 31a, on-course sensor 16 senses an off-course condition and closes switch 17b, and the timer 35 must be in a "down" condition to close switch 35b. With these three conditions being met, radio deviation signal from amplifier 13 may be applied to mixer 15 through the three switches described even though the radio path through beam modifier 14 is at the time opened due to excessive and erratic radio signal.

The operation of timer 35 is initiated by on-course sensor 16 through its tie-in with to-from amplifier 29 when the radio error exceeds a predetermined value as when the aircraft flies into the cone of confusion at point 1 in FIGURE 3. Thus at point 1 the on-course sensor indicates an off-course condition. The to-from amplifier 29 indicates a "to" condition and the timer 35 is started. Between points 1 and 2 on FIGURE 3, timer 35 continues to operate in an "up" direction, until point 2 is reached. At point 2 the to-from indicator changes from To to From. As will be further discussed, this To-From change is used to reverse timer 35, and timer 35 is caused to run down with the same speed or slightly slower than it took to run up. Thus it is noted that the extent to which the timer runs up is determined by the speed of the aircraft or the time that the aircraft is flying between points 1 and 2 on FIGURE 3. Timer 35 is reversed and begins to run down as the aircraft reaches point 2.

As previously discussed, the pilot may have selected a new course and heading at point 2 and thus by the time the aircraft reaches point 3 on FIGURE 3, the timer will have run down and closed switch 35b in FIGURE 4. As the aircraft reaches point 3 on FIGURE 3, the three conditions are met to cause a bypass of the beam modifier 14 and allow radio to reach the mixer 15. At point 3 the timer has run down, the on-course relay indicates off course, and the to-from indicator indicates From. As resistance 32 is serially inserted in this bypass path such that excessive radio signal is not allowed to reach mixer 15, but sufficient radio signal is allowed to reach mixer 15 to direct the aircraft toward the desired course. Thus the disadvantageous exclusion of radio under the flight condition illustrated in FIGURE 3 may be removed by the incorporation of the timing and logic circuitry above discussed. It should be noted that the bypass of the beam modifier 14 to enable the passage of radio signal to mixer 15 under what is still an off-course condition is completely compatible with the normal operation of the beam modifier circuitry. The logic circuitry necessitates that the aircraft be flying from the station with regard to a selected course, that the off-course relay be in off-course position, and that the timer be run down to effect the bypass.

The timer may additionally operate a second switch 35a to effectively shunt beam modifier 14 should the timer reach its upper limit. The upper limit of the timer, that is, the extent of time during which the timer may operate in the "up" direction, is discretely fixed considering nominal aircraft velocities and turning rates in conjunction with the average size of the cone of confusion at various altitudes. For the purpose of the present invention the timer is allowed to move in an "up" position for approximately 1.2 minutes. This amount of time is considered ample for operational aircraft to fly between the edge of the cone of confusion and the center as indicated by points 1 and 2 respectively in FIGURE 3.

Previous discussion indicated that a still further disadvantageous flight condition might be encountered as illustrated in FIGURE 5 wherein the pilot may tune to a second station and desire to follow a given course to the new station; yet the aircraft may assume a ground track displaced from that which is desired. For this reason, the timer of the present invention additionally includes the switch 35a of FIGURE 4 which is closed should the timer reach its upper limit and which when closed will effect a bypass of the beam modifier 14 and allow radio signal to reach mixer 15. Thus with reference to FIGURE 5, as the pilot switches from station 1 to station 2 at point 1, an off-course condition is immediately reflected in the on-course sensor 16. Radio is thus prevented, by action of beam modifier 14, from reaching the mixer 15 and the aircraft flies on heading command to assume the 180° heading illustrated in FIGURE 5. The timer 35 of the present invention is, however, energized and begins to run up at point 1. The timer is ineffective in controlling the aircraft operation until the timer reaches its upper limit 1.2 minutes after the station switch at point 1, whereupon the timer closes upper limit switch 35a and effects a shunt or bypass around the beam modifier 14 to enable radio, though excessive, to be passed to mixer 15.

The aircraft then is directed toward the newly selected course along the path to point 3 and the radio signal is under the control of the timing bypass until the aircraft flies near enough the newly selected course to reflect an on-course condition.

With the attainment of an on-course condition, the horizontal guidance system reverts to normal operation and the artificial bypasses provided by the present invention are removed and readied for subsequent insertion should the flight situations so demand.

The manner in which the timing circuitry is selectively energized and controlled and the necessary logic provisions to insure complete system compatibility under all flight conditions will be further described with reference to the functional schematic diagram of FIGURE 6 in conjunction with the schematic diagrams of FIGURES 7, 8, and 9.

FIGURE 6 illustrates schematically the timing and logic circuitry as it is integrated into the horizontal guidance system to selectively control the inclusion of radio deviation in the formation of a bank command signal. As previously discussed, radio deviation error is taken from radio deviation amplifier 13 and applied through connector 25 to beam modifier 14 and simultaneously through connector 24 to on-course sensor 16. The circuitry bypassing the beam modifier is, as before described, three switches, each of which must be closed to complete the shunt. The switching logic requires that the on-course sensor be indicating an off-course condition (switch 17b); that the aircraft be flying From the radio station on the selected course (switch 31a); and that the timer be in the "down" position (switch 35b). Provisions are included such that the timer is energized to run "up" from a "down" position only when the aircraft has been on course at least once and then experiences an off-course condition as is experienced when the aircraft flies into the cone of confusion over a radio station, and finally that the aircraft be initially flying To the radio station on the selected course. Provisions in the switching and logic circuitry insure that under all other normal conditions of guidance, the timer is forced to the extreme "down" position. Further logic circuitry insures that the normal monitoring function of beam modifier 14 occurs only during an on-course condition. The logic circuitry thus insures that the timer functions only under flight conditions previously discussed wherein radio is desired though it would normally be cut out by the beam modifier. These conditions and the manner in which they are met will become more apparent from a further analysis of the circuitry of FIGURE 6.

On-course sensor 16 is adapted to energize an on-course relay 17 when the radio deviation error through connector 24 falls beneath a predetermined value and thus relay 17 is energized during an on-course condition. Relay 17 controls a first set of contacts 17b which form the first of the three serially connected switches which must simultaneously be closed to bypass the beam modifier. Switch 17b is closed when the on-course relay 17 is unenergized which reflects an off-course condition. On-course relay 17 further controls a second set of contacts 17a which selectively connect a source of 28 volts D.C. from connector 30 to a relay 40, timer upper limit switch 35a, and disabling circuitry for beam modifier 14 and to-from amplifier 29, details of which will be further discussed.

Timer 35 is ultimately controlled by to-from amplifier 29. To-from amplifier 29 is adapted to energize a to-from relay 31 through connector 34 when the input thereto from to-from indicator 28 through connector 52 reflects a To indication. Operational details of to-from amplifier 29 will be further discussed. It is sufficient at this point to indicate that to-from amplifier 29 energizes relay 31 only in response to a To indication from to-from indicator 28. During the application of a From indication from to-from indicator 28, to-from amplifier 29 does not energize relay 31. A second input to to-from amplifier 29 indicated as "28 VDC swamping" from connector 41 insures that to-from amplifier 29 has no output signal in the presence of the swamping voltage and hence, during the application of swamping voltage through connector 41, the to-from relay 31 is unenergized. Relay 31 controls a set of contacts 31b which, in the unenergized position illustrated, cause the timing motor 35 to be driven down. In the energized position of relay 31, contacts 31b cause the timing motor to be driven up. The manner in which this is accomplished is as follows.

Timing motor 35 is a synchronous alternating-current motor driven from a 115-volt source 47. The energizing source 47 for the timing motor finds two selective paths to ground depending upon the position of contacts 31b of the to-from relay 31. In the position illustrated, the 115 volts pass through the upper portion of the motor winding 46 through contacts 31b to ground. This latter energization drives the motor in a predetermined direction, the limit of which is considered the "down" position of the timer. When the extreme "down" position is reached, a down-limit switch 49 is opened to interrupt the motor operation.

Now should the to-from relay 31 be in the energized position, it is seen that the timing motor energizing source 47 is completed through the lower portion of motor winding 46 to ground and thus timing motor turns in the opposite direction which is termed the "up" direction. Should the extreme "up" position be reached, an up-limit switch 50 is opened to stop the motor. The motor shaft 51 drives the "down" and "up" limit switches 49 and 50 through appropriate gear trains (not illustrated). The motor further drives timer switch 35b which is opened when the motor is in any position other than full "down," and a second timer switch 35a which closes only should the timer run to its extreme upper limit. The functioning of timer switch 35b has been previously discussed as being one of the three switches which must be simultaneously closed to effect a shunt about beam modifier 14 to provide a radio path when radio would normally be interrupted by beam modifier 14. The timer upper limit switch 35a is noted not to shunt beam modifier 14 when closed but further discussion will show that under certain conditions the closing of upper limit switch 35a will apply a 28-volt direct-current disabling voltage through connector 18 to the beam modifier. The function of this disabling voltage is to force an electronic switch which is part of beam modifier 14 to be closed in spite of the condition of the radio deviation signal input to beam modifier 14 through connector 25. Thus, in effect, the application of the 28-volt disabling source to beam modifier 14 is functionally consistent with the consideration of a shunt being effected about beam modifier 14. This particular disabling action will be further discussed in conjunction with the functioning of contacts 17a of on-course relay 17 and further logic circuitry controlling the application of the 28 volts D.C. from connector 30.

With the on-course relay 17 in the off-course position illustrated, the 28-volt D.C. source from connector 30 is connected through relay contacts 17a, through connector 44 to the timer upper limit switch 35a, and further to the wiper arm of contacts 40a of a second relay 40. Thus, the 28-volt D.C. source may be connected to junction point 60 when timer upper limit switch 35a is closed or at any time that relay 40 is energized to close contacts 40a. Junction point 60 is seen to be connected to beam modifier 14 through connector 18 and is further connected through resistor 42 and connector 41 to to-from amplifier 29. Thus the presence of 28 volts D.C. from source 30 at junction point 60 simultaneously causes beam modifier 14 to pass radio as though shunted and disables or swamps to-from amplifier 29 such that to-from relay 31 is de-energized to drive the timer in the "down" direction.

A still further source of 28 volts may be momentarily connected to junction point 60 through conductor 39

This source is indicated as a 28-volt gate stemming from function selector circuitry conventionally incorporated with the associated autopilot to energize the autopilot and select various modes of operation. Thus the function selector might include an off position as well as operating mode positions, such as nav/loc, approach, gyro, etc. The 28-volt fader gate illustrated as being applied on connector 39 is initiated with any change in the function selector switch. Thus, when the autopilot is first energized and turned to the nav/loc function as it would be to include the horizontal guidance circuitry of the present invention, the fader pulse is generated for approximately a four-second period. Details of this fader pulse are not a part of the present invention. It would suffice to mention that the fader pulse is utilized to insure a smooth transition from one autopilot operating mode to another.

Thus with reference to FIGURE 6, any time that the function selector for the autopilot is turned to the nav/loc mode, the 28-volt fader gate will appear on connector 39 and be applied to junction point 60 to energize relay 40. With a closing of contacts 40a of relay 40, it is seen that the 28-volt source from terminal 30 may be applied through relay contacts 17a when they are in the off-course condition indicated to form a holding circuit for relay 40 and thus maintain relay 40 in an energized condition until the 28-volt source is broken through relay contacts 17a. The latter occurs when an on-course condition is realized for any period of time. It is seen then that upon initial function selection in the autopilot to the nav/loc mode that 28 volts D.C. is present on junction point 60 until such a time as the aircraft reaches an on-course condition. During this period of time the beam modifier 14 is disabled and is forced to pass radio and the to-from amplifier 29 is swamped to insure, through action of to-from relay 31, that the timing motor 35 is driven toward and/or held in its down limit.

The significance of the circuitry of FIGURE 6 may now be described in conjunction with the flight situation of FIGURE 3. One might first consider the autopilot function selector being positioned to nav/loc mode of operation and the pilot tuning in the VOR radio station 11 while electing to fly a course of 90° to radio station 11. Should the aircraft, at the time the station is tuned in, be off the selected course, the on-course relay 17 is de-energized and the fader gate initiated by the selection of the nav/loc mode energizes and holds relay 40 closed. The 28 volts D.C. from terminal 30 is thus applied to junction point 60 and hence to beam modifier 14 and to-from amplifier 29. Thus the beam modifier, as previously discussed, is forced to close its electronic switch and permit the radio to pass from the deviation amplifier 13 to mixer 15. In the absence of this 28-volt disabling pulse, the beam modifier 14 would normally respond to an excessive radio signal and cut out radio from the mixing function. The to-from amplifier 29 is swamped by the 28-volt signal through connector 41 such that the to-from relay 31 is de-energized and contacts 31b thereof are in the position indicated to insure that the timer is driven to its down limit.

It is to be noted that, should the aircraft be on the selected 90° course at the time of course selection, the on-course sensor would reflect an on-course condition such that relay 40 would remain energized only for the duration of the fader gate since there would be no need to hold the swamping and disabling functions were the aircraft on the initially selected course. Compatibility with either initial situation is thus realized.

In either of the above initial situations the aircraft subsequently would attain and hold the 90° selected course and on-course sensor 16 would energize on-course relay 17 since the radio deviation error would fall beneath the on-course sensor threshold. Contacts 17a of relay 17 would then open relay 40 were it energized to remove the disabling 28 volts from beam modifier 14 through conductor 18 such that the beam modifier is readied to be responsive to excessive or erratic radio signals as is normally desired. The swamping voltage to the to-from amplifier 29 would, however, be retained, since the 28 volts from terminal 30 is carried through the "on" position of relay contact 17a and resistor 43 to the to-from amplifier. This latter swamping path is ineffective in disabling beam modifier 14 since such a path would include both resistors 43 and 42 and the resulting voltage applied to the beam modifier would be insufficient to disable the beam modifier. Thus, with the aircraft flying on a course of 90° to station 11 as indicated in FIGURE 3, the guidance circuitry functions normally to include radio and heading error in the development of the bank command signal and is readied to exclude radio should it become excessive or erratic.

As the aircraft intercepts the cone of confusion at point 1 in FIGURE 3, the radio signal becomes excessive and varies erratically. Thus, the beam modifier 14 operates to close its electronic switch and prevent the radio signal from reaching mixer 15. At the same time on-course sensor 16 responds to the first radio signal in excess of a predetermined value to reflect an off-course condition with the subsequent de-energization of on-course relay 17. Also at point 1, the aircraft is flying to the station 10 and thus to-from indicator 28 supplies the to-from amplifier 29 with a "to" signal. The swamp applied to to-from amplifier 29 through conductor 41 is removed since the on-course relay is in "off" position and thus the To indication from to-from indicator 28 is amplified in to-from amplifier 29 to energize the to-from relay 31. Contacts 31b of relay 31 are thus in the To position which, as previously described, causes timer 35 to drive in the "up" direction.

The aircraft continues flying between points 1 and 2 on heading only and, when point 2 is reached, the to-from indicator changes to indicate flight From station 11. The pilot at this point 2 changes to a new course and heading of 180°. The aircraft responds to the heading error signal to cause a turn toward the new heading of 180°. Simultaneously, the to-from amplifier, in response to a From indication from to-from indicator 28, de-energizes to-from relay 31 such that timer 35 begins to back down at point 2 at the same rate at which it was driven up. As point 3 of FIGURE 3 is reached, the aircraft may have reached the new heading of 180° but, as previously discussed, may be sufficiently displaced from the desired course such that radio is excluded through the action of beam modifier 14. However, at about point 3 timer 35 will have been driven to its "down" position and closed the timer switch 35b. The closing of switch 35b completes the shunt about beam modifier 14 since the three necessary conditions for effecting the shunt are realized, namely, the timer switch 35b is down; the to-from relay is in the From position and thus contacts 31a are closed; and the aircraft is in an off-course condition with respect to the newly selected 180° course such that contacts 17b of on-course relay 17 are in the "off" position. Radio error is thus shunted about beam modifier 14 whose electronic switch is open and applied to mixer 15 through series resistor 32 which prevents excessive radio from causing too severe a command to the aircraft controls.

With the presence of radio in the formulation of the bank command signal, the aircraft is forced to approach the desired course until such a time as an on-course condition with respect to the new radio course is realized, whereupon on-course relay 17 is once again energized to the on-course position and the shunt about the beam modifier 14 is removed through the opening of contacts 17b of on-course relay 17. Contact 17a of on-course relay 17 once again provides the swamping voltage through resistor 43 and connector 41 to to-from amplifier 29 such that the to-from relay is retained in the unenergized position and the timing motor is assured to be retained in the "down" position.

The significance of the timer upper limit switch 35a may be explained with respect to the previously discussed adverse flight situation of FIGURE 5. Here the aircraft is flying a course of 90° to navigation station 1. At point 1 the pilot may desire to tune in navigation station 2 and select a heading and course of 180° to navigation station 2. Immediately upon switching to navigation station 2 the radio error is excessive and beam modified 14 prevents the radio from being applied to mixer 15. The aircraft then flies in accordance with heading command only to attain the newly selected 180° heading. In this flight situation there is no tie-in with the to-from indicator to initiate a back-down of the timer. However, the timer as before begins to move up at the instant of station change since the swamping voltage to to-from amplifier 29 is removed by the action of on-course relay 17 changing to "off" position. Relay 40 would not be energized since no fader gate pulse would be present in the absence of function switching. The to-from indicator 28 indicates a To condition with respect to the second navigation station so that to-from amplifier 29 energizes to-from relay 31 to position contacts 31b in the To position to drive the timer up. Since no change-over from To to From will be experienced in this flight situation (the flight path does not include passage over a station), the timer continues in the presence of the off-course condition to move up until approximately 1.2 minutes after the switch to navigation station 2 is made, at which time the upper limit of the timer is reached and the timer upper limit switch 35a is closed. With the closure of switch 35a, 28 volts D.C. is carried from terminal 30 through connectors 44 and 45 to terminal 60 whereupon relay 40 is energized. Relay 40 remains closed until on-course relay 17 changes to on-course position. The 28 v. D.C. signal is completed through conductor 18 to beam modifier 14 to force the electronic switch of beam modifier 14 to close and pass the otherwise rejected radio signal. Thus radio, even though excessive to the extent of normally being rejected by beam modifier 14, is passed to mixer 15 and the aircraft is directed toward the newly selected course of 180° to navigation station 2. Upon reaching an on-course condition, on-course relay 17 is once again energized to open relay 40 and break the 28-volt path through contacts 40a to the beam modifier and thus restore the beam modifier to normal operation. Simultaneously, 28 volts are applied through relay contact 17a and resistor 43 to swamp to-from amplifier 29 such that the timer 35 is again driven toward its "down" position.

The beam modifier 14, on-course sensor 16, and to-from amplifier 29 have been discussed with respect to their functioning in response to certain input and control signals. FIGURES 7, 8, and 9 schematically illustrate embodiments incorporating magnetic amplifier principles which may in a preferred embodiment be incorporated to provide the previously discussed functions of these three signal translating devices.

Figure 7:
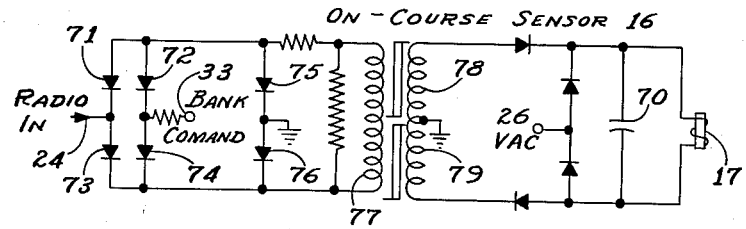
FIGURE 7 is a schematic diagram of a preferred type of on-course sensor which may be used in the systems of FIGURES 2, 4, and 6.

With reference to FIGURE 7, on-course sensor 16 might be comprised of a magnetic amplifier application as illustrated wherein a control winding 77 is wound common to a pair of core members and first and second power windings 78 and 79 are wound individually on each of the core members. In the absence of a D.-C. signal being applied to the control winding 77, the power windings 78 and 79, in conjunction with an alternating-current power source and necessary diode arrangement, produce an output across capacitor 70 of sufficient magnitude to energize the on-course relay 17. Signal development for the control winding 77 is obtained through a diode network comprised of diodes 71—76. The radio deviation signal is applied from conductor 24 to the junction between diodes 71 and 73, while the bank command signal from connector 33 is applied to the junction between diodes 72 and 74. A return path to ground for both the radio signal and the bank command signal is provided between the remaining diodes 75 and 76. The bridge-like arrangement of diodes functions to develop unidirectional signal path through control winding 77 in the presence of radio or bank command signals of either polarity. Thus a D.-C. signal is applied through control winding 77 with magnitude proportional to the magnitude of the input radio or bank command signals, but always of a polarity so as to reduce the output across output capacitor 70 in the power loop. In the absence of radio or bank command signal, the on-course sensor develops an output voltage across condenser 70 sufficient to keep on-course relay 17 energized. When the radio signal exceeds a predetermined value or the bank command signal exceeds a predetermined magnitude, control winding 77 produces a degenerative effect upon the output voltage across capacitor 70 such that on-course relay 17 is de-energized for input signals exceeding these predetermined magnitudes. By judicious choice of circuit parameters, the output characteristic, that is, the voltage across output capacitor 70, may be caused to drop sharply from a voltage sufficient to keep relay 17 energized to a voltage which falls far beneath the threshold of the relay. It should be noted that, although the on-course sensor has been illustrated as a magnetic amplifier application in FIGURE 7, other signal translating devices responsive to given input signal thresholds may be incorporated in the present invention. For the purpose of the present invention the on-course sensor must respond to de-energize the on-course relay 17 to indicate an off-course condition when the input to the circuit exceeds a predetermined value. Thus a transistorized switching circuit, such as described in previously-referenced co-pending application Serial No. 752,340, might equally serve to provide the desired functioning.

Figure 8:
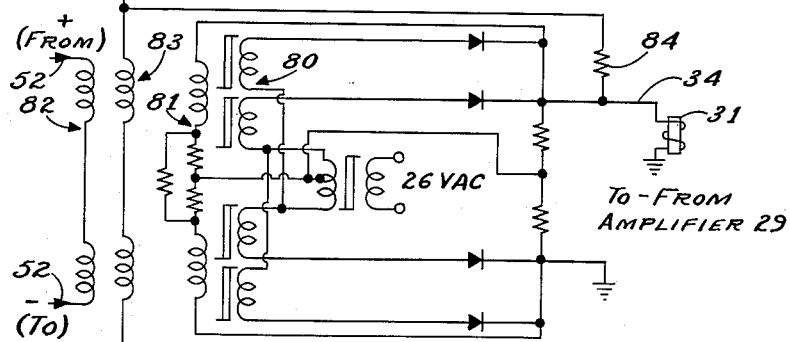
FIGURE 8 is a schematic diagram of the to-from amplifier of FIGURES 4 and 6 in accordance with the present invention.

A preferred embodiment of to-from amplifier 29 of the present invention might be a further magnetic amplifier application as illustrated in FIGURE 8. To-from amplifier controls to-from relay 31 and the circuitry must function such that the relay 31 is closed only in response to an input signal indicative of a To condition received through connector 52 from to-from indicator 28. Relay 31 is not energized when a From input signal is received. The to-from amplifier is further to be rendered unresponsive to input signals in the presence of a swamping voltage being applied through connector 41; i.e., relay 31 shall be unenergized in the presence of a swamping voltage on connector 41 regardless of the amplifier input from to-from indicator 28.

FIGURE 8 illustrates a full-wave push-pull amplifier of the self-saturating type employing negative feedback to achieve linearity and stability. The magnetic amplifier includes for this purpose a plurality of power windings 80 in conjunction with an A.-C. power source and conventional diode arrangement, biasing windings 81, and control windings 82 to which the input signal from the to-from indicator is applied. A further set of control windings 83 is included to which the swamping voltage is applied through connector 41. With the presence of the previously discussed 28-volt swamping voltage on connector 41, the output from the to-from amplifier at connector 34 is drastically reduced. A feedback path from connector 34 through resistor 84 is connected to the windings 83 to insure that the swamping action is rapidly effective upon the application of the swamping voltage at connector 41.

As indicated in FIGURE 8, a To or From input signal is indicative of a particularly polarized D.-C. voltage being applied through control windings 82. In the application of a From signal, the output from the amplifier is controlled by windings 82 to be beneath the threshold for relay 31 and the relay 31 is de-energized. With the application of a To input signal to control windings 82, the output from the magnetic amplifier is increased to a magnitude exceeding the threshold of relay 31, and thus relay 31 is energized by a To input signal. The circuit is thus seen to energize relay 31 only in response to a To input signal and in the absence of a swamping voltage being applied to the amplifier through connector 41.

Figure 9:
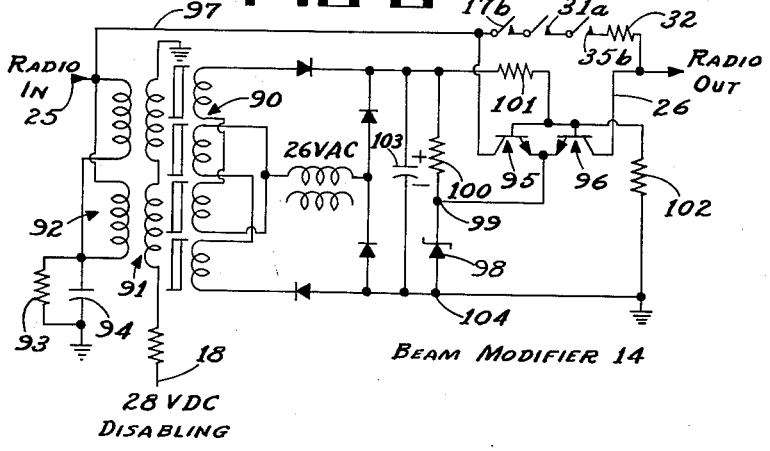
FIGURE 9 is a schematic diagram of a preferred type of beam modifier which may be used in the systems of FIGURES 2, 4, and 6.

A type of beam modifier 14 which may be preferably incorporated in the present invention is shown in FIGURE 9. As previously discussed, the beam modifier 14 of the present invention includes a normally closed electronic switching means through which the radio signal from connector 25 is serially connected to mixer 15. The electronic switch is normally closed to allow the passage of radio and means must be incorporated such that a radio signal exceeding a predetermined value or one which is varying erratically will effect an opening of the electronic switch so as to prevent the passing of radio signal to mixer 15. Beam modifier 14 must additionally be disabled by the presence of the 28-volt disabling voltage from connector 18. In the presence of the disabling voltage, the normally closed electronic switch of the beam modifier cannot be opened even though the radio signal input is excessive or is varying erratically.

The preferred beam modifier circuitry of FIGURE 9 is basically that disclosed and claimed in concurrently filed co-pending application entitled "Electronic Switch" assigned by Kittrell et al. to the assignee of the present invention. The circuit comprises a full-wave magnetic amplifier arrangement with power windings 90 connected in series and the control windings 92 connected in parallel. This arrangement provides a fixed polarity output across capacitor 103 for inputs of either polarity. The magnetic amplifier output characteristic as seen across caapcitor 103 is maximum in the absence of an input signal from connector 25. Increasing the input signal through control windings 92 to a predetermined positive or negative value causes the magnetic amplifier output as seen across capacitor 103 to drop quite sharply to a comparatively low voltage. The voltage across capacitor 103 appears across two voltage dividing networks; the first consisting of resistor 100 and zener diode 98, and the second consisting of resistors 101 and 102. Thus junction point 99 will not rise above the zener voltage defined by diode 98 with respect to junction 104. However, the junction between resistors 101 and 102 can vary from a point exceeding the zener voltage to a point falling beneath the zener voltage depending upon the magnitude of the input signal to control windings 92. Transistors 95 and 96 have their bases tied to the junction between resistors 101 and 102 while their emitters are tied to junction point 99. Thus whenever the junction between resistors 101 and 102 falls beneath the zener voltage at junction point 99, transistors 95 and 96 are cut off. It is noted that the radio input signal through connector 97 is taken through the emitter-collector junctions of the two transistors to output line 26. The two transistors 95 and 96 thus form an electronic switch serially inserted between the radio input terminal 25 and the radio output line 26. The switch is selectively opened when the radio input exceeds a predetermined value. The circuit is made voltage rate sensitive by the addition of capacitor 94 shunted across the input resistor 93 in the control winding circuit.

As employed in the present invention, the above-discussed beam sensor is further provided with a second control winding 91 to which the 28-volt disabling line 18 is tied. In the presence of 28 volts D.C. on connector 18, magnetic amplifier conducts excessively to insure that the junction between resistors 101 and 102 is at a potential sufficiently above junction point 99 to render transistors 95 and 96 conductive regardless of the magnitude or rate variation of the radio signal applied to control windings 92. Thus in the presence of the disabling voltage on connector 18, control windings 92 are rendered ineffective in controlling the magnetic amplifier output voltage. The shunt previously discussed as being closed about beam modifier 14, should relay connectors 17b, 31a, and timer switch 35b be simultaneously closed, is illustrated in FIGURE 9 as forming a series circuit which bypasses the radio path through transistors 95 and 96. When these relay and switch connections are closed, radio may pass from input connector 25 through connector 97 and the series switch circuit to the output line 26 and thence to mixer 15.

Although the above-described beam modifier circuit has been illustrated in a preferred embodiment of the present invention, it is to be understood that other signal translating circuitry may perform the desired function. For example, the beam modifier 14 of the present invention might be comprised of individual radio analyzing circuitry in conjunction with an electronic switch such as disclosed in the previously referenced co-pending application Serial No. 752,340. The output from the beam analyzer amplifier of application Serial No. 752,340, which occurs when radio is excessive or varies erratically, might be taken through contacts of a further relay which is energized in response to the 28-volt disabling voltage on connector 18 of the present invention, whereby an output from the beam analyzer amplifier is not connected to open the electronic switch in the presence of 28 volts on connector 18. For the purpose of the present invention, therefore, the beam modifier need only perform the function of selectively opening an electronic switch to exclude radio from mixer 15 unless disabling voltage is present on connector 18 to force the electronic switch closed.

The present invention is thus seen to provide a novel, time-enabled beam sensor and logic circuitry for the horizontal guidance signal development portion of an autopilot whereby radio may be selectively excluded during conditions of unreliability and wherein circuitry is provided to bypass or override the normal radio exclusion function under certain flight conditions wherein radio must necessarily be included with heading error signal to develop a composite bank command signal which will bring the aircraft onto a desired course.

Although the invention has been described with respect to a particular embodiment thereof, it is not to be so limited as changes might be made therein which are within the spirit and scope of the invention as defined in the appended claims.

We claim:

1. In a horizontal control signal development system for aircraft guidance of the type including means for receiving signals from a course-defining radio station and developing therefrom course deviation signals with respect to a radio defined course, means for selectively combining said radio course deviation signals with aircraft heading error signals to form a composite bank command signal and switching means whereby radio is selectively excluded from said composite bank command signal should it exceed a predetermined magnitude or rate-of-change of magnitude; means for selectively effecting a bypass of said switching means comprising first, second, and third switches, said switches being serially connected to form a shunt path about said switching means, means for closing said first switch in response to said radio course deviation signals exceeding a further predetermined magnitude, signal development means, said signal development means being adapted to provide an output signal therefrom with polarity peculiarly indicative of aircraft location to and from said course-defining radio station with respect to said radio-defined course, timing means, said timing means being activated in response to said course deviation signals exceeding said further predetermined magnitude and being further adapted to close said second switch a predetermined time thereafter, said signal development means being additionally operably connected to and closing said third switch in response to aircraft location from said radio station with respect to said radio-defined course, said first, second, and third switches when simultaneously closed effecting a shunt about said switching means, said shunt being held effective until said course deviation signals fall beneath said further predetermined magnitude.

2. Horizontal guidance circuitry for development of a bank command signal for aircraft flight control comprising mixing means, the output from said mixing means connected to aircraft horizontal control means, means for developing a first input signal with magnitude and polarity respectively indicative of the extent and direction of displacement of an aircraft from a course defined by a radio station, means for selecting said radio-defined course, means providing a signal in accordance with the heading of said aircraft, signal comparison means, said signal comparison means providing a second input signal proportional to the difference between said aircraft heading and said preselected radio-defined course, said second input signal being connected to said mixing means, first signal translating means receiving said first input signal and excluding the passage of said signal therethrough when said signal exceeds a predetermined magnitude or rate-of-change of magnitude, the output from said first signal translating means connected to said mixing means, time-activated switch actuating means, further signal development means, said further signal development means producing output signals indicative of aircraft orientation to and from said radio station with respect to said preselected radio-defined course, said further signal development means connected to said time-activated switch actuating means, second signal translating means receiving said first input signal, a first switch, said second signal translating means closing said first switch when said first input signal exceeds a further predetermined magnitude, a second switch, said time-activated switch actuating means in response to predetermined inputs from said further signal development means closing said second switch a predetermined time after the closing of said first switch, a third switch, said further signal development means additionally closing said third switch in response to a predetermined input thereto, said first, second, and third switches being respectively serially connected and effectively shunting said first signal translating means when simultaneously closed, whereby said first input signal may be connected through said aforedescribed series connection of said first, second, and third switches to said mixing means until said first input signal falls beneath said further predetermined magnitude whereupon said second signal translating means effects an opening of said first switch to break said series switch connection.

3. In a horizontal control signal development system for aircraft guidance of the type including means for receiving signals from a course-defining radio station and developing therefrom course deviation signals with respect to a radio defined course, means for selectively combining said radio course deviation signals with aircraft heading error signals to form a composite bank command signal and switching means whereby said course deviation signals are selectively excluded from said composite bank command signal should they exceed a predetermined magnitude or rate-of-change of magnitude; means for selectively effecting a bypass of said switching means comprising first, second, and third switches, said switches being serially connected to form a shunt path about said switching means, means for closing said first switch in response to course deviation signals exceeding a predetermined magnitude, signal development means, said signal development means being adapted to provide an output signal therefrom with polarities respectively indicative of aircraft location to and from the course-defining radio station with respect to said radio-defined course, timing means, said timing means being activated in response to said course deviation signals exceeding a further predetermined magnitude and being further adapted to close said second switch a predetermined time thereafter, said signal development means being additionally operably connected to selectively close said third switch in response to aircraft location from said radio station with respect to said radio-defined course, said first, second, and third switches when simultaneously closed effecting and holding a shunt about said switching means until said radio deviation signal falls beneath said further predetermined magnitude, a fourth switch, said timing means being adapted to close said fourth switch a further predetermined time after activation of said timing means in the absence of signal input to said timing means from said signal development means indicative of aircraft location from said radio station with respect to said radio-defined course, said fourth switch upon being closed providing a further effective bypass of said switching means, said further bypass being held effective until said course deviation signals fall beneath said further predetermined magnitude.

4. In a horizontal control signal development system for aircraft guidance of the type including means for receiving signals from a course-defining radio station and developing therefrom course deviation signals with respect to a radio defined course, means for selectively combining said radio course deviation signals with aircraft heading error signals to form a composite bank command signal and an electronic switching means, whereby said course deviation signals are selectively excluded from said composite bank command signal should they exceed a predetermined magnitude or rate-of-change of magnitude; means for selectively effecting a bypass of said electronic switching means comprising first, second, and third switches, said switches being serially connected to form a shunt path about said electronic switching means, means for closing said first switch in response to course deviation signals exceeding a predetermined magnitude, signal development means, said signal development means being adapted to provide an output signal therefrom with polarity peculiarly indicative of aircraft location to and from said course-defining radio station with respect to said radio-defined course, timing means, said timing means comprising a synchronous timing motor, an energizing source for said timing motor, motor switch means operably connected with said timing motor and said energizing source to enable a reversal of said timing motor rotation, means for limiting each direction of rotation of said motor, said motor switch means operably connected to said signal development means to effect motor rotation in a first direction in response to signals indicative of aircraft flight to said radio station defining said radio-defined course and to further effect rotation in a second direction in response to signals indicative of aircraft flight from said radio station defining said radio-defined course; control means for said signal development means adapted to render the output from said signal development output means indicative of aircraft flight from the radio station defining said radio-defined course in response to said course deviation signal being less than a further predetermined magnitude, said second switch being operated by said timing motor and cooperatively connected therewith to close when said timing motor is positioned to the limit of its second direction of rotation, said signal development means being additionally operably connected to close said third switch in response to aircraft location from said radio station with respect to said radio-defined course, said first, second, and third switches when simultaneously closed effecting a shunt about said electronic switching means, said shunt being held effective until said course deviation signal falls beneath said further predetermined magnitude.

5. In a horizontal control signal development system for aircraft guidance of the type including means for receiving signals from a course-defining radio station and developing therefrom course deviation signals with respect to a radio defined course, means for selectively combining said radio course deviation signals with aircraft heading error signals to form a composite bank command signal and an electronic switching means whereby course deviation signals are selectively excluded from said composite bank command signal should they exceed a predetermined magnitude or rate-of-change of magnitude; means for selectively effecting a bypass of said electronic switching means comprising first, second, and third switches, said switches being serially connected to form a shunt path about said electronic switching means, first signal translating means adapted to close said first switch in response to course deviation signals exceeding a further predetermined magnitude, signal development means, said signal development means being adapted to provide an output signal therefrom with polarity peculiarly indicative of aircraft location to and from said course-defining radio station with respect to said radio-defined course, timing means, said timing means comprising a synchronous timing motor, an energizing source for said timing motor, motor switch means operably connected with said timing motor and said energizing source to enable a reversal of said timing motor rotation, means for limiting each direction of rotation of said motor, said motor switch means operably connected to said signal development means to effect motor rotation in a first direction in response to signals indicative of aircraft flight to said radio station defining said radio-defined course and to further effect rotation in a second direction in response to signals indicative of aircraft flight from said radio station defining said radio-defined course; control means, said control means receiving said course deviation signal, said control means connected to said signal development means and adapted to render the output from said signal development output means indicative of aircraft flight from said radio station defining said radio-defined course in response to said course deviation signal being less than said further predetermined magnitude, said second switch being operated by said timing motor and cooperatively connected therewith to close when said timing motor is positioned to the limit of its second direction of rotation, said signal development means being additionally operably connected to close said third switch in response to aircraft location from said radio station with respect to said radio-defined course, said first, second, and third switches when simultaneously closed effecting a shunt about said electronic switching means, said shunt being held effective until said course deviation signal falls beneath said further predetermined magnitude, a fourth switch, said timing motor operably connected to said fourth switch to effect a closure thereof when said timing motor is positioned to the limit of its first direction of rotation, said fourth switch upon being closed providing a further effective bypass of said electronic switching means, said further bypass being held effective until said course deviation signal falls beneath said further predetermined magnitude.

6. In a horizontal control signal development system for aircraft guidance of the type including means for receiving signals from a course-defining radio station and developing therefrom course deviation signals with respect to a radio defined course, means for selectively combining said radio course deviation signals with aircraft heading error signals to form a composite bank command signal and an electronic switching means whereby said course deviation signals are selectively excluded from said composite bank command signal should they exceed a predetermined magnitude or rate-of-change of magnitude; means for selectively effecting a bypass of said electronic switching means comprising first, second, and third switches, said switches being serially connected to form a shunt path about said electronic switching means, first signal translating means adapted to close said first switch in response to course deviation signals exceeding a further predetermined magnitude, signal development means, said signal development means being adapted to provide an output signal therefrom with polarity peculiarly indicative of aircraft location to and from said course-defining radio station with respect to said radio-defined course, timing means, said timing means comprising a synchronous timing motor, an energizing source for said timing motor, motor switch means operably connected with said timing motor and said energizing source to enable a reversal of said timing motor rotation, means for limiting each direction of rotation of said motor, said motor switch means operably connected to said signal development means to effect motor rotation in a first direction in response to signals indicative of aircraft flight to said radio station with respect to said radio-defined course and to further effect rotation in a second direction in response to signals indicative of aircraft flight from said radio station with respect to said radio-defined course; further switching control means comprising a source of direct-current voltage, a junction point, a fourth switching means being operably connected to first signal translating means and being positionable to first and second positions in response to course deviation signals beneath and in excess of said further predetermined magnitude respectively, said direct-current voltage source connected through the first position of said fourth switching means to said signal development means, said signal development means in response to said direct-current voltage adapted to produce an output indicative of aircraft flight from said radio station with respect to said radio-defined course, a holding relay including an energizing coil and a pair of normally open contacts operably positioned thereby a first one of said pair of contacts connected to said direct-current voltage source through the second position of said fourth switch, the second one of said holding relay contacts connected through said energizing coil to a return path for said direct-current voltage source, said junction point connected to said second one of said holding relay contacts, said junction point connected to said signal development means and to said electronic switching means to respectively effect a disabling of said signal development means and enforce a closure of said electronic switching means when said direct-current source is connected to said junction point, means for providing a momentary direct-current voltage to said junction point in response to initial energization of said system, said second switch being operated by said timing motor and cooperatively connected therewith to close when said timing motor is positioned to the limit of its second direction of rotation, said signal development means being additionally operably connected to close said third switch in response to aircraft location from said radio station with respect to said radio-defined course, said first, second, and third switches when simultaneously closed effecting a shunt about said electronic switching means, said shunt being held effective until said course deviation signal falls beneath said further predetermined magnitude.

7. In a horizontal control signal development system for aircraft guidance of the type including means for receiving signals from a course-defining radio station and developing therefrom course deviation signals with respect to a radio defined course, means for selectively combining said radio course deviation signals from a radio receiver with aircraft heading error signals to form a composite bank command signal and an electronic switching means whereby course deviation signals are selectively excluded from said composite bank command signal should they exceed a predetermined magnitude or rate-of change of magnitude; means for selectively effecting a bypass of said electronic switching means comprising first, second, and third switches, said switches being serially connected to form a shunt path about said electronic switching means, first signal translating means adapted to close said first switch in response to course deviation signals exceeding a further predetermined magnitude, signal development means, said signal development means being adapted to provide an output signal therefrom with polarity peculiarly indicative of aircraft location to and from said course-defining radio station with respect to said radio-defined course, timing means, said timing means comprising a synchronous timing motor, an energizing source for said timing motor, motor switch means operably connected with said timing motor and said energizing source to enable a reversal of said timing motor rotation, means for limiting each direction of rotation of said motor, said motor switch means operably connected to said signal development means to effect motor rotation in a first direction in response to signals indicative of aircraft flight to said radio station with respect to said radio-defined course and to further effect rotation in a second direction in response to signals indicative of aircraft flight from said radio station with respect to said radio-defined course; further switching control means comprising a source of direct-current voltage, a junction point, a fourth switching means being operably connected to first signal translating means and being positionable to first and second positions in response to course deviation signals beneath and in excess of said further predetermined magnitude respectively, said direct-current voltage source connected through the first position of said fourth switching means to said signal development means, said signal development means in response to said direct-current voltage adapted to produce an output indicative of aircraft flight from said radio station with respect to said radio-defined course, a holding relay including an energizing coil and a pair of normally open contacts operably positioned thereby, a first one of said pair of contacts connected to said direct-current voltage source through the second position of said fourth switching means, the second one of said holding relay contacts connected through said energizing coil to a return path for said direct-current voltage source, said junction point connected to said second one of said holding relay contacts, said junction point connected to said signal development means and to said electronic switch means to respectively effect a disabling of said signal development means and enforce a closure of said electronic switching means when said direct-current source is connected to said junction point, means for providing a momentary direct-current voltage to said junction point in response to initial energization of said system, said second switch being operated by said timing motor and cooperatively connected therewith to close when said timing motor is positioned to the limit of its second direction of rotation, said signal development means being additionally operably connected to close said third switch in response to aircraft location from said radio station with respect to said radio-defined course, said first, second, and third switches when simultaneously closed effecting a shunt about said electronic switching means, said shunt being held effective until said radio deviation signal falls beneath said further predetermined magnitude, a fifth switch, said timing means operably connected to said fifth switch to effect a closure thereof when said timing motor is positioned to the limit of its first direction of rotation, said fifth switch connected across the first and second contacts of said relay and upon being closed thereby providing a further effective bypass of said electronic switching means, said further bypass being held effective until said course deviation signal falls beneath said further predetermined magnitude.

8. A horizontal control signal development system as defined in claim 6 wherein said signal development means comprises a magnetic amplifying device including control windings and power windings, said radio receiver providing an input signal to said control windings having first and second polarities indicative respectively of aircraft position to and from the course-defining radio station with respect to said preselected course, said amplifier being adapted to provide an output exceeding a predetermined threshold in response to said first input signal polarity, a to-from relay operably connected to said magnetic amplifier output, said to-from relay including said motor switch means, said to-from relay being operable in response to said predetermined threshold output to position said motor switch means to a position enabling rotation of said timing motor in said first direction, said magnetic amplifier including a further control winding, said further control winding being connected to said junction point and producing a magnetic amplifier output below said predetermined threshold in the presence of said direct-current voltage thereon, said magnetic amplifier effecting to-from relay action to selectively position said motor switch means to drive said timing motor in said second direction in the presence of an input signal thereto indicative of flight from said radio station on said radio-defined course and to further drive said timer in said second direction in the presence of said direct-current signal on said further control winding, said timing motor thereby being driven in said first direction in the presence of a magnetic amplifier input indicative of flight to said radio station with respect to said radio-defined course in the absence of said direct-current voltage being applied to said further control winding.

9. A horizontal control signal development system as defined in claim 7 wherein said signal development means comprises a magnetic amplifying device including control windings and power windings, said radio receiver providing an input signal to said control windings having first and second polarities indicative respectively of aircraft position to and from the course defining radio station with respect to said preselected course, said amplifier being adapted to provide an output exceeding a predetermined threshold in response to said first input signal polarity, a to-from relay operably connected to said magnetic amplifier output, said to-from relay including said motor switch means, said to-from relay being operable in response to said predetermined threshold output to position said motor switch means to a position enabling rotation of said timing motor in said first direction, said magnetic amplifier including a further control winding, said further control winding being connected to said junction point and producing a magnetic amplifier output below said predetermined threshold in the presence of said direct-current voltage thereon, said magnetic amplifier effecting to-from relay action to selectively position said motor switch means to drive said timing motor in said second direction in the presence of an input signal thereto indicative of flight from said radio station on said radio-defined course and to further drive said timer in said second direction in the presence of said direct-current signal on said further control winding, said timing motor thereby being driven in said first direction in the presence of a magnetic amplifier input indicative of flight to said radio station with respect to said radio-defined course in the absence of said direct-current voltage being applied to said further control winding.

10. In a horizontal control signal development system for aircraft of the type including means for receiving signals from a course-defining radio station and developing therefrom a course deviation signal with respect to a radio defined course, means for selectively combining said radio course deviation signals with aircraft heading error signals to form a composite bank command signal and first switching means whereby said course deviation signal is selectively excluded from said composite bank command signal should it exceed a predetermined magnitude or rate-of-change of magnitude; means for selectively rendering said first switching means ineffective in excluding said course deviation signal comprising further normally open switching means connected to said first switching means, means for developing a first switch control parameter in response to said radio signal exceeding a further predetermined magnitude, means for developing a second switch control parameter in response to an aircraft location from said course-defining radio station with respect to said radio defined course, time-activated means for developing a third switch control parameter a predetermined time after said radio signal exceeds said further predetermined magnitude, said further switching means operably connected to and being activated by the simultaneous development of said first, second, and third switch control parameters, said further switching means when activated rendering said first switching means ineffective to block said course deviation signal.

11. In a horizontal control signal development system for aircraft of the type including means for receiving signals from a course-defining radio station and developing therefrom course deviation signals with respect to a radio defined course, means for selectively combining said radio course deviation signals with aircraft heading error signals to form a composite bank command signal and first switching means whereby radio is selectively excluded from said composite bank command signal should it exceed a predetermined magnitude or rate-of-change of magnitude; means for selectively effecting a bypass of said switching means comprising further normally open switching means connected in a shunt path about said first switching means, means for developing a first switch control parameter in response to said radio signal exceeding a further predetermined magnitude, means for developing a second switch control parameter in response to an aircraft location from said course defining radio station with respect to said radio defined course, means for producing a third switch control parameter a predetermined time after said radio signal exceeds said further predetermined magnitude, said further switching means operably connected to and being closed by the simultaneous development of said first, second, and third switch control parameters.

12. In a horizontal control signal development system for aircraft of the type including means for receiving signals from a course-defining radio station and developing therefrom course deviation signals with respect to a radio defined course, means for selectively combining said radio course deviation signals with aircraft heading error signals to form a composite bank command signal and first switching means whereby said course deviation signals are selectively excluded from said composite bank command signal should they exceed a predetermined magnitude or rate-of-change of magnitude; means for selectively rendering said first switching means ineffective in excluding said course deviation signal comprising first, second, and third switches, means for closing said first switch in response to said deviation signal exceeding a further predetermined magnitude, means for closing said second switch in response to an aircraft location from said course defining radio station with respect to said radio defined course, means for closing said third switch a predetermined time after said course deviation signal exceeds said further predetermined magnitude, said first, second, and third switches operably connected to said first switching means, the simultaneous closing of said first, second, and third switches rendering said first switching means ineffective in excluding said course deviation signals.

References Cited in the file of this patent
UNITED STATES PATENTS

| | | |
|---|---|---|
| 2,801,059 | Hecht et al. | July 30, 1957 |
| 2,845,623 | Iddings | July 29, 1958 |
| 2,881,992 | Hecht et al. | Apr. 14, 1959 |